United States Patent [19]

Donegan

[11] 4,144,834
[45] Mar. 20, 1979

[54] DEFROST INDICATOR

[76] Inventor: James Donegan, 2455 Washington Ave., Bronx, N.Y. 10458

[21] Appl. No.: 754,847

[22] Filed: Dec. 27, 1976

[51] Int. Cl.$^2$ ............................................. G01K 11/06
[52] U.S. Cl. ..................................... 116/219; 73/358; 426/88; 116/206
[58] Field of Search ........................ 116/114.5, 114 V; 73/358; 426/88, 249, 250

[56] References Cited

U.S. PATENT DOCUMENTS

| | | | |
|---|---|---|---|
| 1,535,536 | 4/1925 | MacDonald | 116/114.5 |
| 2,379,459 | 7/1945 | Schreiber et al. | 73/358 |
| 2,593,566 | 1/1949 | Kamp | 426/250 |
| 2,662,018 | 12/1953 | Smith | 73/358 X |
| 2,852,394 | 9/1958 | Fahringer | 116/114.5 |
| 3,220,259 | 11/1965 | Beyer | 426/88 X |

Primary Examiner—Daniel M. Yasich
Attorney, Agent, or Firm—Richard L. Miller

[57] ABSTRACT

A thaw-indicating device that is visibly positioned in a package of frozen food so to warn a consumer if the food item has ever been subjected to being thawed, and thus being spoiled even if refrozen subsequently; the device consisting of a transparent plastic capsule having a sealed singular compartment in one end of which there is a colorless, clear, frozen ice and in the other end of which there is a powdered dye that is soluble in water, so that if the ice melts into water due to thawing temperatures the entire interior of the capsule is visibly colored.

2 Claims, 5 Drawing Figures

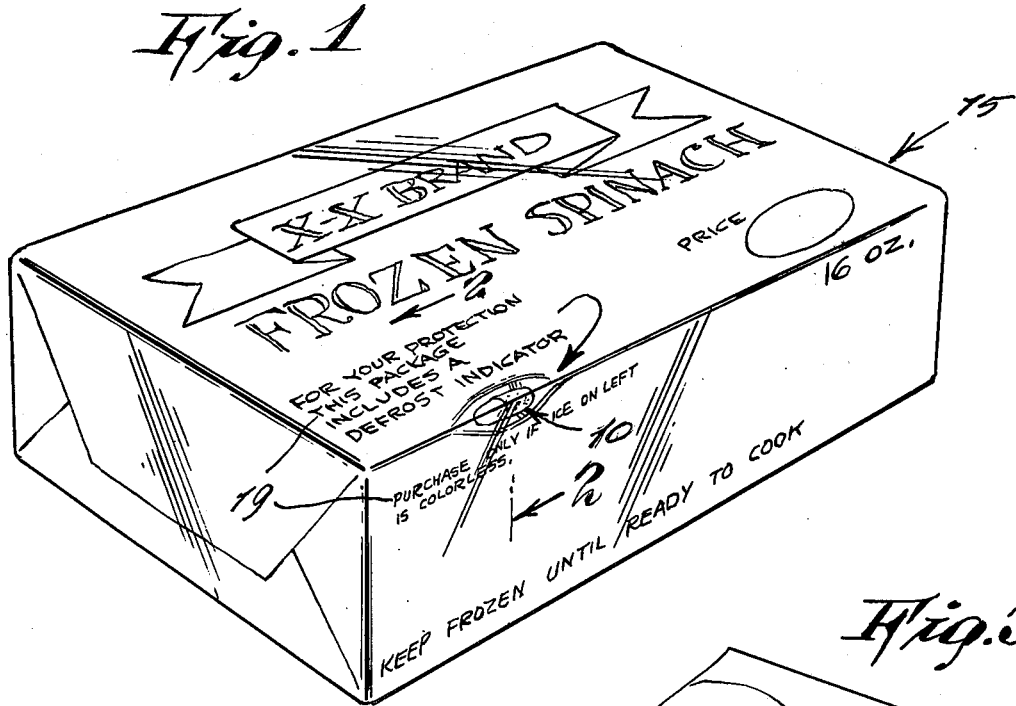
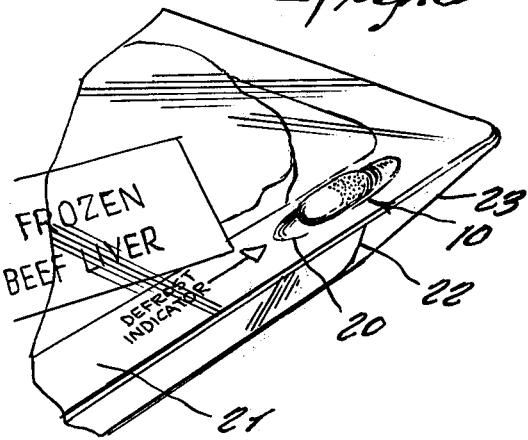
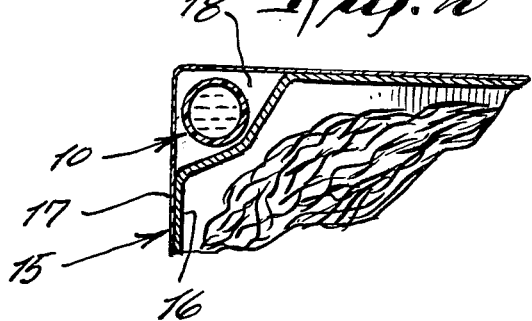
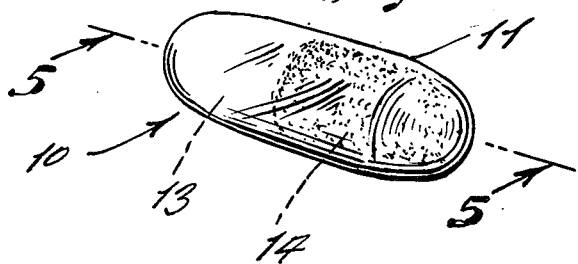
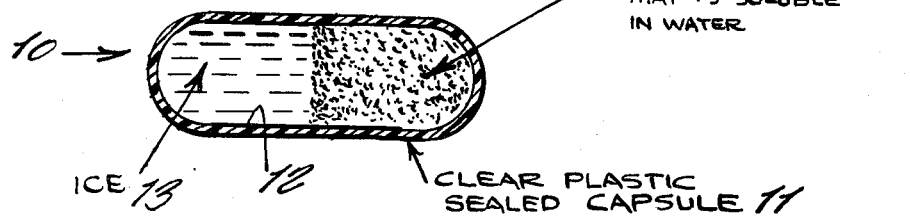

DEFROST INDICATOR

This invention relates generally to packaged frozen foods. More specifically it relates to thaw temperature indicators.

It is generally well known to all food shoppers and homemakers that packaged frozen foods purchased in a food store must be constantly kept in a frozen condition until such time they are intended to be cooked or eaten. If such frozen food item is ever thawed out and then refrozen, there is a danger of the food having become spoiled, and a consumer thereof is subject to becoming sick or poisoned. In case there is an electric power failure such as during storms when falling trees or heavy ice accumulation disrupts outdoor power lines, a freezer containing frozen foods may within a few hours become warm enough so that such food thaws out. This can occur in a consumer's own home freezer or in a freezer of a food distributor or retail food store. This thawing out condition may never become known to a consumer or a store operator if they are away, and the electric power is restored several hours later so that the food package becomes refrozen.

This situation is serious and is therefore, in want of an improvement.

Accordingly, it is a principal object of the present invention to provide a defrost indicator placeable visibly inside a frozen food package and which instantly indicates whether at any time the food has defrosted since its packaging.

Another object is to provide a defrost indicator which will protect a consumer against food poisoning, readily expose unscrupulous food merchants who try to pass off refrozen foods and which will advance the quality of foods consumed by a public.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown installed in a package of frozen food.

FIG. 2 is an enlarged cross-sectional view on line 2—2 of FIG. 1, showing the invention under a cellophane cover of the package.

FIG. 3 is a fragmentary view of a packaged frozen tray of meat with the invention installed therein.

FIG. 4 is an enlarged perspective view of the defrost indicator shown alone.

FIG. 5 is a cross-section on line 5—5 of FIG. 4.

Referring now to the drawing in detail, the reference numeral 10 represents a defrost indicator according to the present invention wherein there is an elongated capsule 11 made of transparent plastic and having a sealed, single, central compartment 12 within one end of which there is a frozen ice 13 made from clear water so that it is colorless. Within an opposite end of the compartment there is a quantity of powdered or granular dye 14 which is normally soluble in water.

Alternately the ice may be made of any other frozen liquid than water, and the dye is such as to be soluble in the particular liquid.

The defrost indicator 10, thus manufactured, is installed in a frozen condition in any kind of frozen food package as shown in FIGS. 1 and 3; the defrost indicator being positioned inside the package and located behind a clear, transparent covering material of the package.

Thus the package 15 shown in FIG. 1 may contain frozen foods such as either vegatables, fruits, meats, fish, ice cream or the like and includes carton 16 covered by clear cellophane 17. A depression 18 in the carton retains the defrost indicator so that it is visible to a consumer through the cellophane. Instructions 19 printed on the carton, inform a consumer how to know if the package was ever thawed.

In use, a consumer should be sure that there is a clear, colorless ice within one end of the defrost indicator. If the entire interior of the defrost indicator is colored, package should not be purchased or used, as this indicates that at some time it had thawed.

In FIG. 3, the defrost indicator 10 is placed in a depression 20 on a rim 21 of a tray 22 containing frozen foods such as either meats, fish or the like; and all of which is then wrapped in a cellophane sheet 23.

The device 10 is thus readily adaptable for installation in all types of frozen food packages or containers.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A defrost indicator for visable installation in a package of frozen food comprising in combination, a capsule formed of transparent material and comprising a single, sealed compartment inside said capsule, said capsule containing in unmixed condition a quantity of colorless frozen ice conforming in shape to a portion of said compartment, and a quantity of powdered dye of a specified color in the other portion of said compartment, said dye being soluble in liquid from which said ice is formed and capable of discoloring said frozen ice into said specified color upon melting of said ice and when a defrost condition is reached, and wherein said single, sealed compartment contains both said frozen ice and said dye at opposite end portions of said compartment.

2. A defrost indicator as in claim 1 and wherein said frozen ice is frozen water and is clear.